United States Patent
Schuerer et al.

(10) Patent No.: US 9,885,594 B2
(45) Date of Patent: Feb. 6, 2018

(54) AIR MASS FLOW METER

(71) Applicant: Continental Automotive GmbH, Hannover (DE)

(72) Inventors: Stephan Schuerer, Regensburg (DE); Thorsten Knittel, Pentling (DE); Stephen Setescak, Pentling (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 77 days.

(21) Appl. No.: 14/911,867

(22) PCT Filed: Jul. 23, 2014

(86) PCT No.: PCT/EP2014/065798
§ 371 (c)(1),
(2) Date: Feb. 12, 2016

(87) PCT Pub. No.: WO2015/022156
PCT Pub. Date: Feb. 19, 2015

(65) Prior Publication Data
US 2016/0202099 A1    Jul. 14, 2016

(30) Foreign Application Priority Data
Aug. 12, 2013 (DE) .................. 10 2013 215 921

(51) Int. Cl.
*G01F 1/698* (2006.01)
*G01F 1/688* (2006.01)
(Continued)

(52) U.S. Cl.
CPC .......... *G01F 1/688* (2013.01); *G01F 1/6845* (2013.01); *G01F 1/696* (2013.01); *G01F 1/6965* (2013.01);
(Continued)

(58) Field of Classification Search
CPC .................................................. F02D 41/187
(Continued)

(56) References Cited

U.S. PATENT DOCUMENTS

| 5,942,683 A | 8/1999 | Aoi et al. ............ 73/202.5 |
| 6,839,643 B2 | 1/2005 | Kanke et al. ............ 702/45 |

(Continued)

FOREIGN PATENT DOCUMENTS

| DE | 3007463 A1 | 9/1981 | ............ F02D 41/18 |
| DE | 19724659 A1 | 12/1997 | ............ F02D 35/00 |

(Continued)

OTHER PUBLICATIONS

German Office Action, Application No. 102013215921.8, 4 pages, dated Jan. 29, 2014.

(Continued)

*Primary Examiner* — Clayton E LaBalle
*Assistant Examiner* — Kevin Butler
(74) *Attorney, Agent, or Firm* — Slayden Grubert Beard PLLC (57) ABSTRACT

The present disclosure provides a method for measuring air mass flow using an air mass flow meter. The air mass flow meter comprises a sensor element for detecting an air mass flow (Q) and for generating a signal (S), and an electronic circuit for processing the signal (S) from the sensor element, wherein the sensor element generates a non-linear signal characteristic. The method may include converting the non-linear signal into a correcting, non-linear signal characteristic, then filtering the correcting, non-linear signal characteristic, then converting the filtered non-linear signal characteristic into a non.-linear signal characteristic, and then generating an output signal relaying the signals (S) detected by the sensor element and processed by the linearization element, the filter element, and the conversion element.

10 Claims, 6 Drawing Sheets

(51) Int. Cl.
*G01F 1/696* (2006.01)
*G01F 25/00* (2006.01)
*G01F 1/684* (2006.01)
*F02D 41/18* (2006.01)
*G01F 5/00* (2006.01)

(52) U.S. Cl.
CPC ........ *G01F 25/0007* (2013.01); *F02D 41/187* (2013.01); *G01F 1/684* (2013.01); *G01F 1/6842* (2013.01); *G01F 1/698* (2013.01); *G01F 5/00* (2013.01)

(58) Field of Classification Search
USPC ..................................................... 73/114.34
See application file for complete search history.

(56) References Cited

U.S. PATENT DOCUMENTS

| | | | | |
|---|---|---|---|---|
| 7,395,707 | B2* | 7/2008 | Watanabe | G01F 1/6842 73/204.26 |
| 9,297,677 | B2* | 3/2016 | Suzuki | G01F 1/696 |
| 2002/0056319 | A1 | 5/2002 | Kobayashi et al. | 73/204.22 |
| 2005/0172930 | A1* | 8/2005 | Pitzal | F02D 41/1497 123/299 |
| 2009/0222231 | A1* | 9/2009 | Berger | F02D 41/187 702/104 |
| 2011/0010076 | A1* | 1/2011 | Heinkele | F02D 41/187 701/103 |

FOREIGN PATENT DOCUMENTS

| | | | | |
|---|---|---|---|---|
| DE | 10129300 A1 | 2/2002 | | G01F 1/684 |
| DE | 10245655 A1 | 1/2004 | | F02D 45/00 |
| DE | 102010014599 | * | 11/2010 | G01F 1/68 |
| DE | 102010014599 A1 | 11/2010 | | G01F 1/68 |
| EP | 2522961 A2 | 11/2012 | | G01D 11/24 |
| GB | 2070782 A | 9/1981 | | F02D 41/18 |
| JP | 2004012358 A | 1/2004 | | F02D 35/00 |
| JP | 2013076601 A | 4/2013 | | G01F 1/696 |
| WO | 2015/022156 A1 | 2/2015 | | G01F 1/684 |

OTHER PUBLICATIONS

International Search Report and Written Opinion, Application No. PCT/EP2014/065798, 19 pages, dated Oct. 2, 2014.

* cited by examiner

AIR MASS FLOW METER

CROSS-REFERENCE TO RELATED APPLICATIONS

This application is a U.S. National Stage Application of International Application No. PCT/EP2014/065798 filed Jul. 23, 2014, which designates the United States of America, and claims priority to DE Application No. 10 2013 215 921.8 filed Aug. 12, 2013, the contents of which are hereby incorporated by reference in their entirety.

TECHNICAL FIELD

The invention relates to an air mass flow meter for detecting an air mass flow. The invention also relates to a method for processing signals of an air mass flow meter, wherein the sensor element generates a non-linear signal characteristic.

BACKGROUND

Air mass flow meters are suitable for detecting a mass flow of a fluid (air mass flow) in a flow channel. Such a flow channel can be, for example, an air intake pipe of an internal combustion engine. Diagnoses, for example, of the operation of the internal combustion engine can be carried out and control of the internal combustion engine can take place as a function of the mass flow detected by the air mass flow meter. For these purposes, detection of the actual mass flow which is also reliable under different operating conditions and is as accurate as possible is important.

DE 197 24 659 A1 discloses a mass flow sensor device which comprises a sensor element. The sensor element is disposed and integrated on a separate chip. Furthermore, evaluation electronics are disclosed, which are designed separately but are electrically coupled to the sensor unit.

Modern air mass flow meters, which are built using microsystem (MEMS) technology, for example, are very rapid and detect nearly every change in the mass air flow. In addition, they can distinguish between air flowing in the air intake pipe to the internal combustion engine and air flowing back from the internal combustion engine. In addition, pulsations in the air intake pipe which result from the cyclic mode of operation of piston internal combustion engines are detected by rapid air mass flow meters and are converted by the sensor element into a signal. These pulsations, however, can result in a considerable adulteration of the measured value for the mean air mass flow.

SUMMARY

The instant disclosure provides a rapid air mass flow meter which has as small an error as possible in the processing of the signal as well as a method for processing signals of an air mass flow meter in which as small a processing error as possible occurs.

Since the electronic circuit first has an element for converting the non-linear signal characteristic from the sensor element into a correcting signal characteristic which is non-linear at least in some segments, errors in the formation of the mean value for the air mass flow in the filter element are substantially reduced. In the case of a sensor element comprising a first and a second temperature sensor, between which a heating element is disposed, the first temperature sensor element, the second temperature sensor element, and the heating element have a response characteristic which usually differs.

For example, the first temperature sensor element is only cooled by the air mass flow and is not heated by the heating element. The second temperature sensor element, however, is initially heated by the heating element and is then cooled more and more as the air mass flow increases. The heating element is exclusively cooled by the air mass flow. In addition, all these components have production tolerances. These aspects can be taken into consideration in the conversion of the non-linear signal characteristic from the sensor element into a correcting signal characteristic which is non-linear at least in some segments.

The correcting signal characteristic which is non-linear at least in some segments can therefore be adapted highly precisely for the individual air mass flow meter on the basis of a range of specific information. This specific information can be stored in an electronic memory of the air mass flow meter. The specific information includes the response characteristic of the first temperature sensor, of the second temperature sensor, and of the heating element, as well as the production tolerances of these components.

The filter element carries out the integration for forming the mean value in the air mass space and not in the signal space. Erroneous further processing of signals, which occurs in particular in the case of low mass flows, can be effectively avoided by means of a conversion element for converting the linear signal characteristic into a correcting signal characteristic which is non-linear at least in some segments. The signals detected by the sensor element and processed by the element for conversion, the filter element, and the conversion element are therefore particularly precise signals which represent the air mass flow in the air mass flow meter. These highly precise signals are transmitted to the engine control unit. A particularly accurate air mass flow meter is therefore disclosed, with the aid of which the combustion of fuel in the cylinders of an internal combustion engine can be optimally set. This is a contribution to the optimal utilization of fossil fuel reserves and to the protection of the environment. The aforementioned also applies for the method for processing signals of an air mass flow meter.

In one embodiment, the sensor element and the electronic circuit are formed on a single semiconductor element. This may have the advantage that the component can be designed cost-effectively and particularly error-free. To this end, the sensor element and the electronic circuit can be produced using microsystem technology.

In some embodiments, the sensor element comprises a first temperature sensor element and a second temperature sensor element. By means of the first and the second temperature sensor element, the air mass flow can be determined simply and accurately using the so-called differential temperature method. To this end, it may comprise a heating element, which is disposed between the first and the second temperature sensor element.

BRIEF DESCRIPTION OF DRAWINGS

The invention is described in greater detail with reference to the following figures. In the drawings.

DETAILED DESCRIPTION

Figure 1:
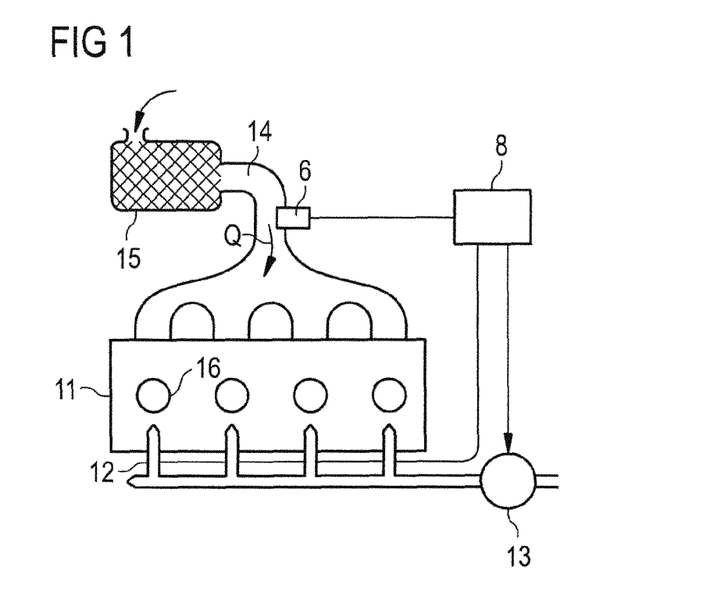
FIG. 1 shows an internal combustion engine, according to the teachings of the present disclosure.

FIG. 1 shows an internal combustion engine 11. This internal combustion engine 11 can be either an internal combustion engine 11 driven with gasoline or an internal combustion engine 11 driven with diesel fuel. It is also conceivable that the internal combustion engine 11 is driven with gas. An intake pipe 14, which is connected to an air filter 15, is evident on the internal combustion engine 11. Outside air is drawn into the air intake pipe 14 through the air filter 15 and is transported to the internal combustion engine 11. For optimal combustion of the fuel, it is necessary to accurately determine the air mass flow Q transported in the air intake pipe 14. This determination of the air mass flow Q is carried out by the air mass flow meter 6, which relays its signal S to the engine control unit 8. The engine control unit 8 controls, for example, the injection pump 13 and the injection nozzles 12 as a function of the signal S delivered by the air mass flow meter 6. In this manner, a precisely metered quantity of fuel is fed, via the injection nozzles 12, to each cylinder 16 of the internal combustion engine 11 in accordance with the drawn-in air mass Q. The exact knowledge of the air mass flow Q toward the cylinders 16 makes possible an optimal combustion of the fuel fed to the internal combustion engine 11 via the injection pump 13 and the injection nozzles 12. This makes possible an optimal efficiency of the internal combustion engine 11 and, therefore, an economical consumption of fuels and less harm to the environment.

Since the known internal combustion engines 11 are cyclic internal combustion engines in which the cylinders 16 are filled, in alternation, with fresh air, after which combustion of the injected fuel takes place, and whereupon the exhaust gases are removed from the cylinders 16, the air mass flow Q toward the internal combustion engine does not take place continuously, but rather said air mass flow is coupled with a so-called pulsation. The pulsations arise because only a certain discrete quantity of fresh air is fed to each cylinder 16 per combustion process.

After the fresh air is fed into the cylinder 16, the air intake valve of the cylinder 16 is closed and the air mass flow Q is abruptly interrupted. These pulsations are clearly exhibited in the signal S of a rapid and modern air mass flow meter 6. The engine control unit 8 cannot process a rapidly pulsating signal S of the air mass flow meter 6, however. Modern air mass flow meters 6 having a micromechanical design pick up these pulsations nearly completely, however, and convert them into an output signal S. Only the mean air mass flow Q is of interest to the engine control unit 8, and it is only this value which the engine control unit 8 can process, in order, for example, to suitably control the injection pump 13 and the injection nozzles 12. In addition, modern engine control devices are controlled by a signal composed of individual digital pulses, wherein the time interval between the individual digital pulses is evaluated as a measure of the air mass flow Q. In this time-difference measurement, the time between the edge of a start signal and the edge of a stop signal is determined with a certain resolution. Whether the rising or the falling edge is used depends on the electronics used in the engine control unit.

The pulsation in the air mass flow Q as well as the transmission of the time signal $\Delta S$ to the engine control unit 8 contain sources of error, from electronic noise signals as well as from the characteristics inherent in modern micromechanical air mass flow meters 6. In the case of a sensor element comprising a first and a second temperature sensor, between which a heating element is disposed, the first temperature sensor element, the second temperature sensor element, and the heating element have a response characteristic which usually differs. For example, the first temperature sensor element is only cooled by the air mass flow and is not heated by the heating element. The second temperature sensor element, however, is initially heated by the heating element and is then cooled more and more as the air mass flow increases. The heating element is exclusively cooled by the air mass flow. In addition, all these components have production tolerances. These sources of error degrade, for example, the resolution in the time-difference measurement during the transmission of the time signal $\Delta S$ to the engine control unit 8.

Figure 2:
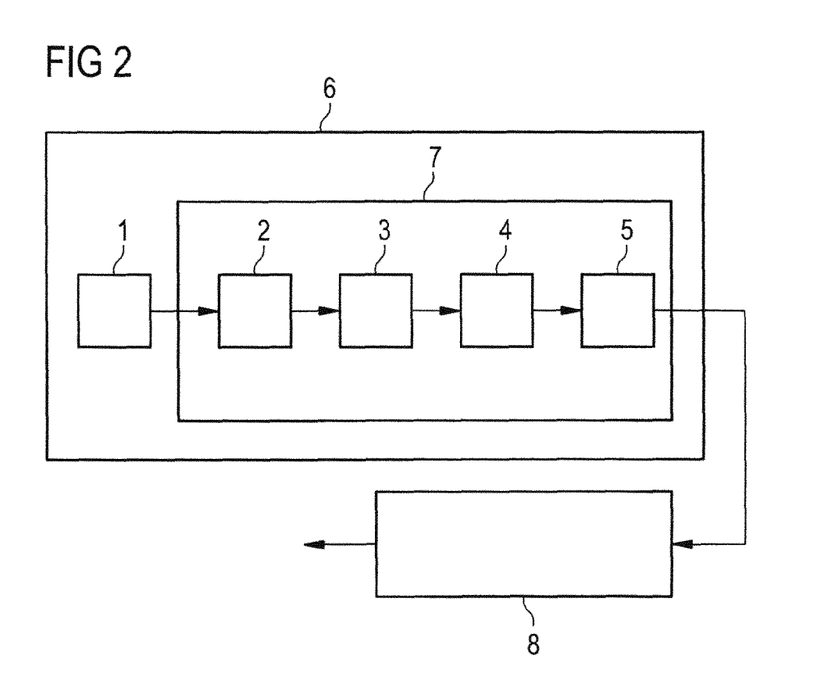
FIG. 2 shows an air mass flow meter having a sensor element, according to the teachings of the present disclosure.

In order to address this problem, FIG. 2 shows an air mass flow meter 6 having a sensor element 1 for detecting an air mass flow Q and for generating a signal S. The sensor element is a rapid sensor element, which is built using microsystem (MEMS) technology, for example. The air mass flow meter 6 comprises an electronic circuit 7 for processing the signal from the sensor element 1. The sensor element 1 exhibits a non-linear signal characteristic. The signal characteristic 9 corresponds to all signals S which can be generated by the sensor element 1 with respect to corresponding air mass flows Q. The non-linear relationship between the air mass flow Q and the signals S of the sensor element 1 will be presented and explained further below in FIG. 3 in the Q-S diagram of the sensor element 1.

The electronic circuit 7 shown in FIG. 2 first has an element 2 for converting the non-linear signal characteristic 9 from the sensor element 1 into a correcting signal characteristic 10 which is non-linear at least in some segments. The thus generated correcting signal S which is non-linear at least in some segments is then relayed to a filter element 3. This filter element 3 integrates the signal S received from the element 2 for converting the non-linear signal characteristic 9. This integration is carried out with respect to time t. Therefore, the integral of the function S(t) is formed with respect to dt (∫S(t)dt) in the filter element 3. In this case, the signal S, as well as the air mass flow Q, is a function dependent on time t. The integral ∫S(t)dt corresponds to the mean air mass flow Q, wherein the pulsations have been filtered out by the filter element 3. The signal S generated by the filter element 3 in this manner is then fed to a conversion element 4 for converting the correcting signal characteristic 10, which is non-linear at least in some segments and which is now integrated, into a non-linear signal characteristic 9. The signal, which is now completely non-linear, is then fed to a relay element 5 for relaying the signal S which was detected by the sensor element 1 and which was processed by the element 2 for conversion, the filter element 3, and the conversion element 4. A digital time signal ΔS is transmitted by the relay element 5 to the engine control unit 8. The time interval between two individual pulses of this digital time signal ΔS then corresponds to the signal value S for the air mass flow Q which is measured by the air mass flow meter 6 having the sensor element 1 and which is further processed by the electronic circuit 7, in particular being averaged.

The air mass flow meter 6 shown in FIG. 2 can be operated using the method according to the invention for processing signals. In this case, the air mass flow meter 6 comprises a sensor element 1 for detecting an air mass flow Q and for generating a signal S. In addition, the air mass flow meter 6 comprises an electronic circuit 7 for processing the signal S from the sensor element 1, wherein the sensor element 1 generates a non-linear signal characteristic 9. In the method according to the invention, first the non-linear signal characteristic 9 is converted by the sensor element 1 into a correcting signal characteristic 10 which is non-linear at least in some segments. Next, the filtering of the correcting signal characteristic 10 which is non-linear at least in some segments is carried out, for example, in an integration of the function ∫S(t)dt, wherein the mean air mass flow Q is determined. Next, the filtered correcting signal characteristic 10 which is non-linear at least in some segments is converted into a non-linear signal characteristic 9, whereupon the signals detected by the sensor element 1 and processed by the element 2 for conversion, the filter element 3, and the conversion element 4 are relayed.

Figure 3:
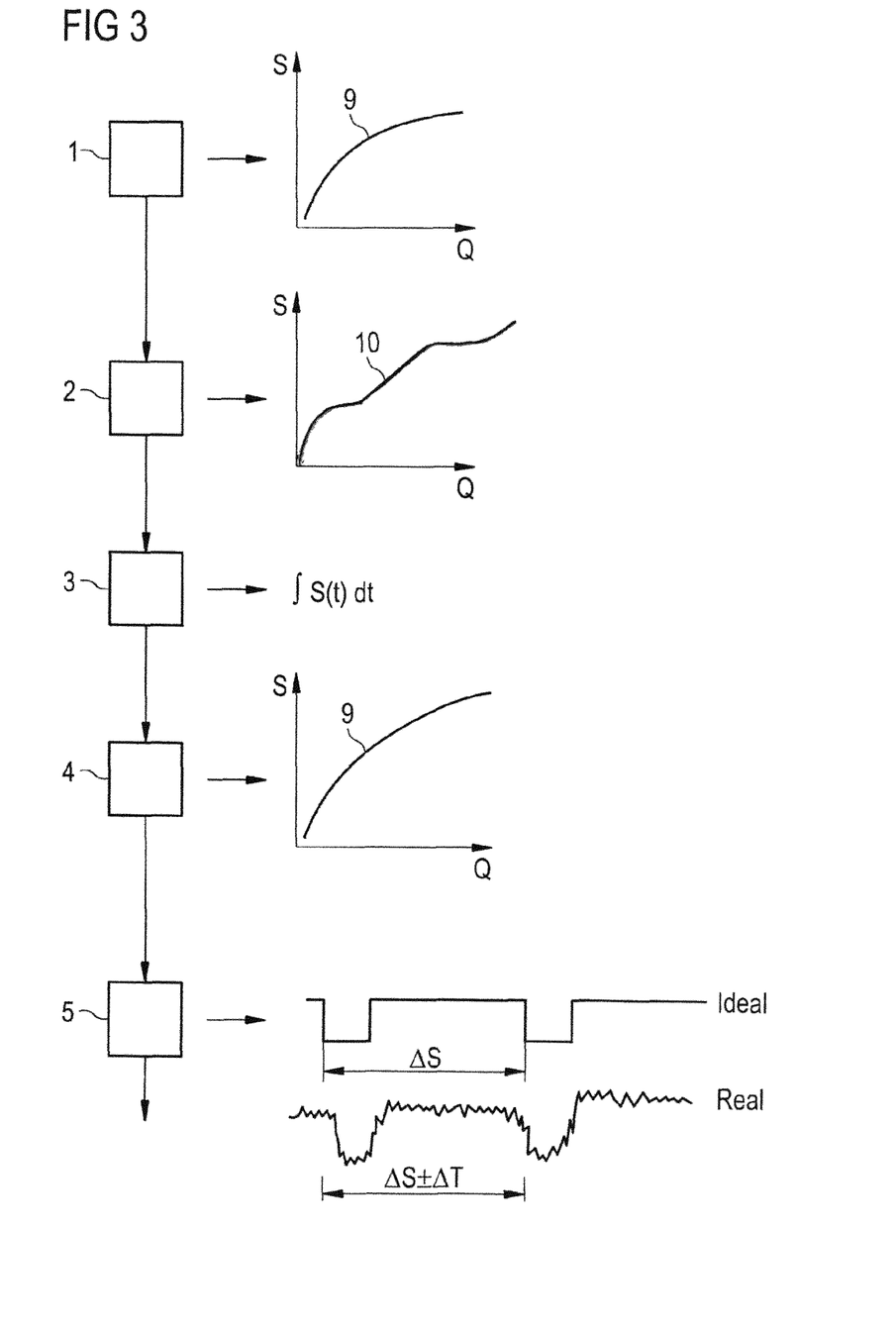
FIG. 3 schematically shows the components of the air mass flow meter, according to the teachings of the present disclosure.

FIG. 3 schematically shows the components of the air mass flow meter 6 according to the invention, including their functions. First, the sensor element 1 is evident, which sensor element is usually designed using MEMS technology (microsystem technology) and detects the air mass flow Q. The sensor element 1 and the electronic circuit 7 may be formed on a single semiconductor element. The rapid sensor element 1 generates a non-linear signal characteristic 9 which is shown in the associated air mass flow Q-signal S diagram.

This non-linear signal characteristic 9 is electronically converted by the element 2 for conversion into a correcting signal characteristic which is non-linear at least in some segments, wherein the signal space generated by the sensor element 1 is exited and a transition takes place back into the real air mass flow space. The diagram of the air mass flow Q and the signal S shown next to the element 2 for conversion shows a correcting characteristic which is non-linear at least in some segments.

The filter element 3 can electronically integrate this correcting characteristic, which is non-linear at least in some segments, and form the integral ∫S(t)dt, whereby a mean air mass flow Q is determined and the pulsations present in the air intake pipe 14 are filtered out. This takes place nearly entirely without error due to the correcting signal characteristic which is non-linear at least in some segments.

After the filter element 3, the element 4 for generating a non-linear signal characteristic 9 is evident. The non-linear signal characteristic 9 is electronically generated by the element 4 for generating a non-linear signal characteristic 9. Proceeding from this non-linear signal characteristic 9, the relay element 5 generates an electronic time signal ΔS, which is fed to the engine control unit 8.

The time signal ΔS generated by the relay element 5 is evident next to the electronic relay element 5. The upper function shows the ideal signal characteristic, from which a sharp time signal ΔS could be transmitted to the engine control unit 8. In reality, unfortunately, the time signals are always electronically noise-infested, which is depicted in the lower time signal ΔS. Due to the electronic noise, an error of +−ΔT is added to the time signal ΔS which is relayed to the engine control unit 8. In order to keep this error ΔT as low as possible, the integrated correcting signal characteristic 10 which is non-linear at least in some segments was converted into a non-linear signal characteristic 9 by the element 4 for generating the non-linear signal characteristic 9. The problem of error propagation with the individual signals S and with the time signal ΔS will be explained further below.

The problem which arises when rapid sensor elements 1 produced using MEMS technology measure an air mass flow Q pulsating in the air intake pipe 14 is explained in greater detail in the figure sequence 4 and 5.

Figure 4A:
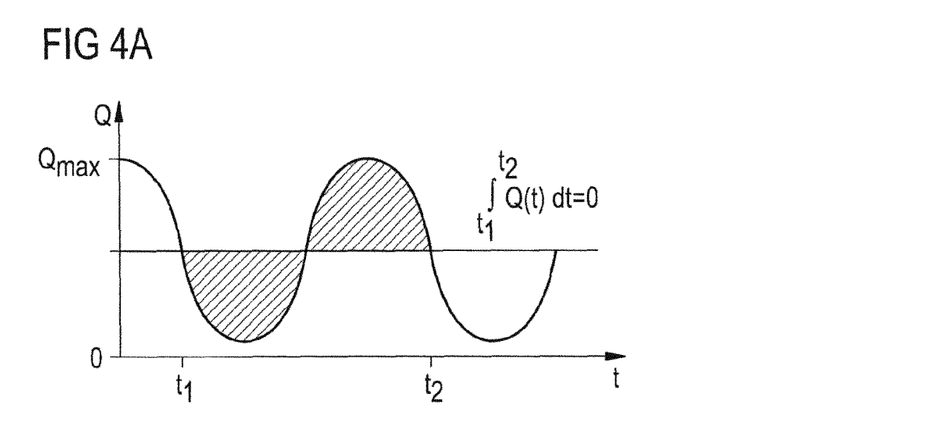
FIG. 4a shows the air mass flow pulsating in the air intake pipe as a function of time, according to the teachings of the present disclosure.
Figure 4B:
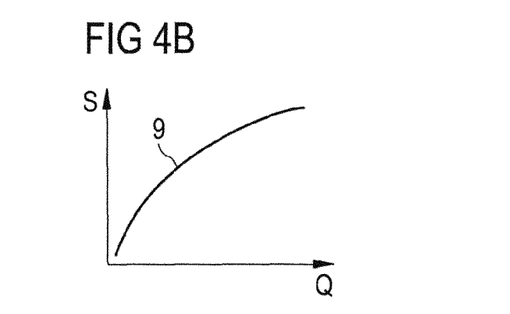
FIG. 4b shows the non-linear signal characteristic of the sensor element, according to the teachings of the present disclosure.

FIG. 4a shows the air mass flow Q pulsating in the air intake pipe 14 as a function of time t. An ideal sinusoidal pulsation is shown here by way of example. In this case, the real air mass flow Q therefore moves in the air intake pipe 14 between a maximum value $Q_{max}$ and a minimum value 0 which occurs when all the air intake valves of the internal combustion engine 11 are closed and the air mass flow Q in the air intake pipe 14 comes to a standstill. Only the mean air mass flow Q is of interest for the engine control unit 8, however. In order to form the mean of the air mass flow Q, the integral of the function Q(t) must disappear, i.e., become equal to zero. This is depicted in FIG. 4a, in that the shaded areas between $t_1$ and $t_2$ having opposite signs are equal in size. This integration cannot be carried out on the air mass flow Q(t) directly, however, but rather only on the signal S(t) generated by the sensor element 1. The typical signal characteristic of a rapid sensor element 1 produced using MEMS technology is shown in FIG. 4b. The non-linear signal characteristic 9 is clearly evident in the air mass flow Q-signal S diagram. After the conversion of the air mass flow Q(t) shown in FIG. 4a by the non-linear sensor element 1 according to the signal characteristic 9 shown in FIG. 4b, the time-dependent signal, S(t), shown in FIG. 4c is obtained.

Due to the non-linear signal characteristic 9, the function S(t) now clearly deviates from the ideal sinusoidal shape. This is shown in FIG. 4c. In this case as well, it is shown that the areas under the two half-waves of the periodic signal having opposite signs should be equal in size in order to form the mean value of the periodic signal. The integration from $t_1$ to $t_2$ via ∫S(t)dt is therefore zero.

Figure 4C:
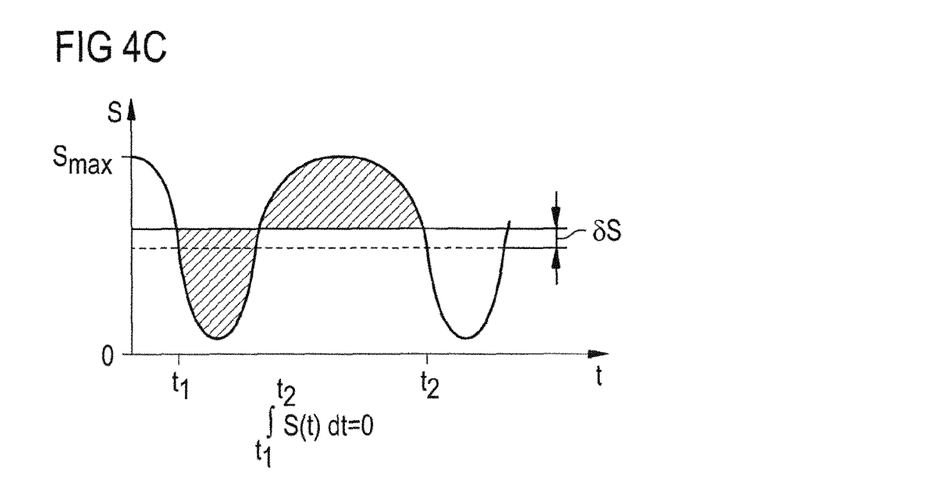
FIG. 4c shows a non-linearized, time-dependent signal, according to the teachings of the present disclosure.

This is shown by the solid horizontal line in FIG. 4c.

In addition, it is evident that this mean value line was raised by the value δs as compared to the real mean value through the non-linear signal characteristic 9. δs represents the error which results from the non-linearity of the rapid sensor element 1 produced using MEMS technology. This error must be accounted for.

Figure 5A:
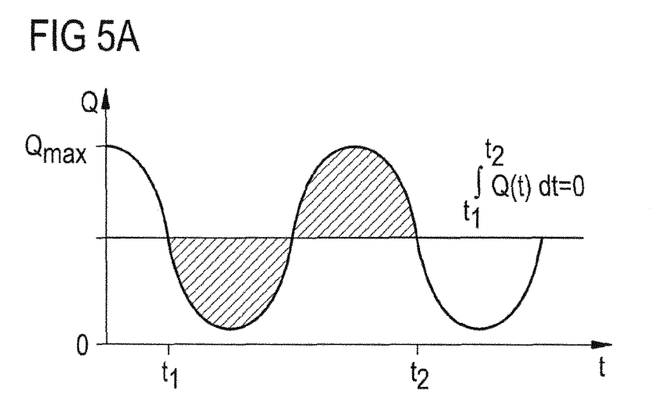
FIG. 5a shows the air mass flow pulsating in the air intake pipe as a function of time, according to the teachings of the present disclosure.
Figure 5B:
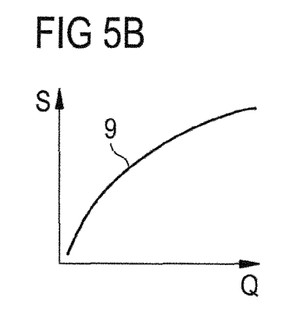
FIG. 5b shows the non-linear signal characteristic of the sensor element, according to the teachings of the present disclosure.

To this end, the ideal sinusoidal function Q(t) of the time-dependent air mass flow Q in the air intake pipe 14 is shown in FIG. 5a. In order to form the mean value in the air mass space, the integral $t_1$ to $t_2 \int Q(t)dt$ must be equal to zero. The non-linear signal characteristic 9 shown in FIG. 5b is used to convert the real air mass flow Q into a signal S with the aid of the sensor element 1, as is known from FIG. 4b. This non-linear signal characteristic 9 is then converted by an element 2 for conversion into a linear signal characteristic 10a. The transition from the non-linear signal characteristic 9 to the linear signal characteristic 10a can be adjusted, with the aid of a characteristic map, for every air mass flow Q located in the measurement range of the sensor element 1 and for every pipe cross section located in the measurement range, in accordance with the requirements of the user of the air mass flow meter.

This characteristic map can be stored, for example, in an electronic memory in the element 2 for conversion. If an electronic integration $\int S(t)dt$ of the signal function S(t) is then carried out with the aid of the filter element 3 after the linearization of the non-linear signal S, there are no deviations whatsoever of the mean value from the mean value for the air mass flow Q present in the real air mass space. The integration error resulting from the non-linear sensor characteristic 9 of the sensor element 1 was eradicated by the linearization of the signal with the element 2 for conversion. The thus determined measured value for the mean air mass flow Q must be relayed to the engine control unit 8 in the form of a time signal, however.

Figure 5C:
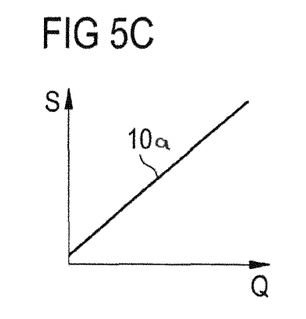
FIG. 5c shows the linearized signal characteristic of the sensor element, according to the teachings of the present disclosure.
Figure 5D:
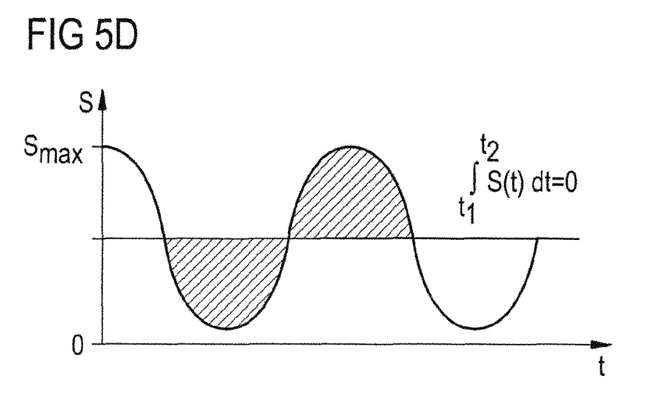
FIG. 5d shows a linearized, time-dependent signal, according to the teachings of the present disclosure.

The conversion of the linear signal characteristic according to FIG. 5c by the element 4 for generating a non-linear signal characteristic 10 after the integration is carried out by the filter element 3 is necessary since the electronic noise in the time signal becomes clearly noticeable particularly in the case of low signal values for the air mass flow Q. This signal characteristic, which is now non-linear again, is particularly well suited to relay a time-dependent signal, which is proportional to the air mass flow Q in the air intake pipe 14, to the engine control unit 8 without generating a large error ΔT in the time signal ΔS.

The commonly used signal processing methods do not account for the different response characteristic of the components of the sensor element 1, however. In the case of a sensor element 1 which comprises, for example, a first and a second temperature sensor, between which a heating element is disposed, the first temperature sensor element, the second temperature sensor element, and the heating element have a response characteristic which usually differs. The first temperature sensor element is only cooled, for example, by the air mass flow and is not heated by the heating element. The second temperature sensor element, however, is initially heated by the heating element and is then cooled more and more as the air mass flow increases. The heating element is exclusively cooled by the air mass flow. In addition, all these components have production tolerances. These sources of error degrade the resolution in the time-difference measurement during the transmission of the time signal ΔS to the engine control unit 8.

Therefore, the present teachings do not only simply linearize the non-linear sensor characteristic 9, but rather to provide it with information regarding the special properties of the sensor element 1 and, therefore, create a correcting signal characteristic 10 which is non-linear at least in some segments and which accounts for component tolerances and different response times of the temperature sensor elements and of the heating element.

Figure 6A:
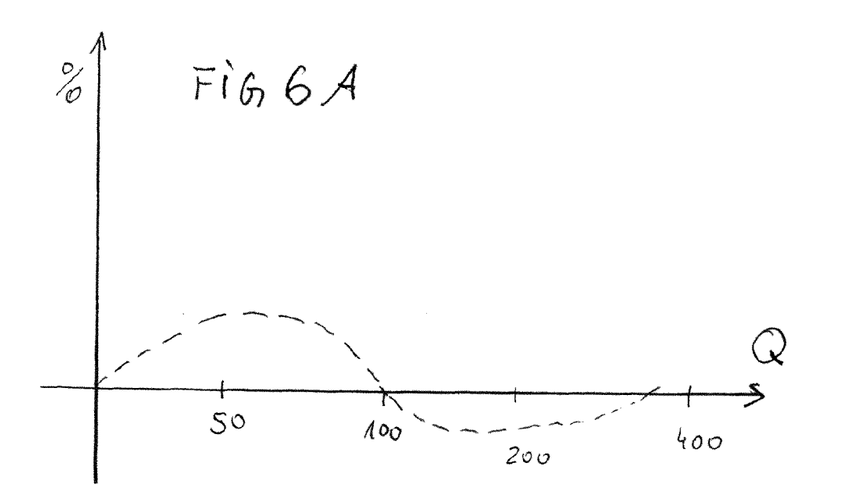
FIG. 6a shows an example of an erroneous signal, according to the teachings of the present disclosure.

FIG. 6a shows an example of an erroneous signal which can result due to the component tolerances and the different response times of the temperature sensor elements 18, 19 and of the heating element 20. In the diagram shown here, Q stands for the air mass flow. The error which results due to the component tolerances and different response times is output in percent. At low air mass flows Q, positive errors result first, since the first temperature sensor element 18 is exclusively cooled, whereas the second temperature sensor element 19 is cooled only slightly by the low air mass flow Q and is therefore heated to an over-proportional extent by the heating element 20.

As the air mass flow Q increases, the error continues to correct itself, wherein, for example, the above-described error is completely compensated given an air mass flow Q of one hundred relative units. The higher air mass flow Q now begins to dominate at the second temperature sensor element 19 and to cool said temperature sensor element to an over-proportional extent, whereupon a negative error sets in, which builds up to approximately four hundred relative units of the air mass flow Q. The errors induced in the air mass flow meter by the component tolerances and different response times are then superposed, which results in an approximation of the optimal error-free range for the air mass flow.

Figure 6B:
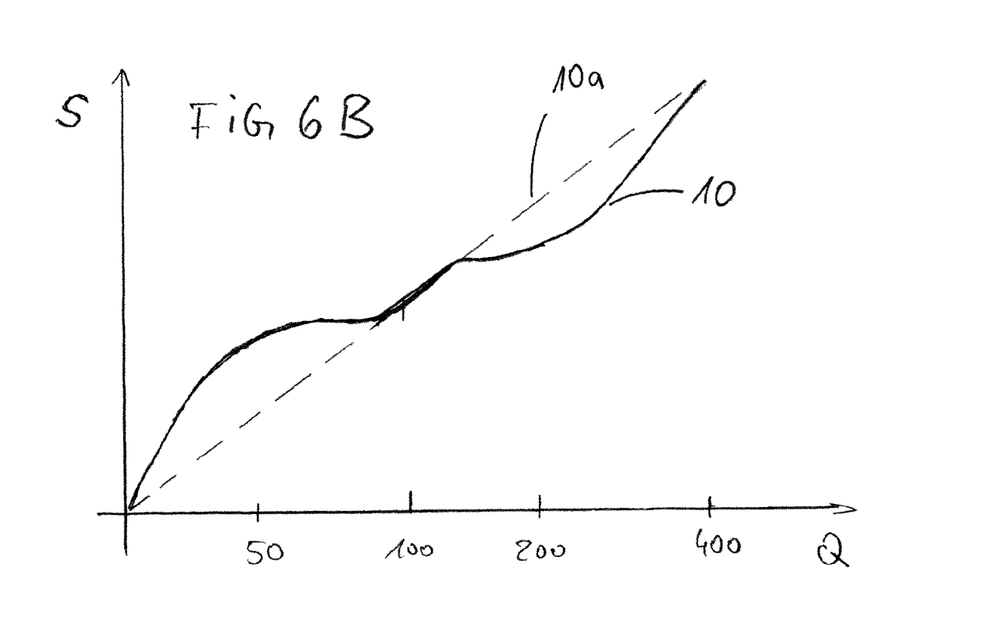
FIG. 6b shows the converted signal of the sensor element as a function of the real air mass flow, according to the teachings of the present disclosure.

FIG. 6b shows the converted signal of the sensor element 1 as a function of the real air mass flow Q. The dashed line 10a shows the non-linear sensor characteristic 9 after its simple linearization. In contrast, the curve having the reference number 10 shows the correcting signal characteristic 10 which is non-linear at least in some segments and which was generated from the non-linear sensor characteristic 9 with consideration for the component tolerances and the different response times. In the first range, the positive error of FIG. 6a was incorporated correspondingly into the correcting signal characteristic 10 which is non-linear at least in some segments, wherein an error-free range of the sensor element 1 is reached in the range of approximately one hundred relative units of the mass flow, in which range the correcting signal characteristic 10 which is non-linear at least in some segments largely corresponds to a linear signal characteristic, whereupon a segment of a negative error follows, which results in strong deviations of the correcting signal characteristic 10 which is non-linear at least in some segments from the linear signal characteristic 10a.

Figure 7:
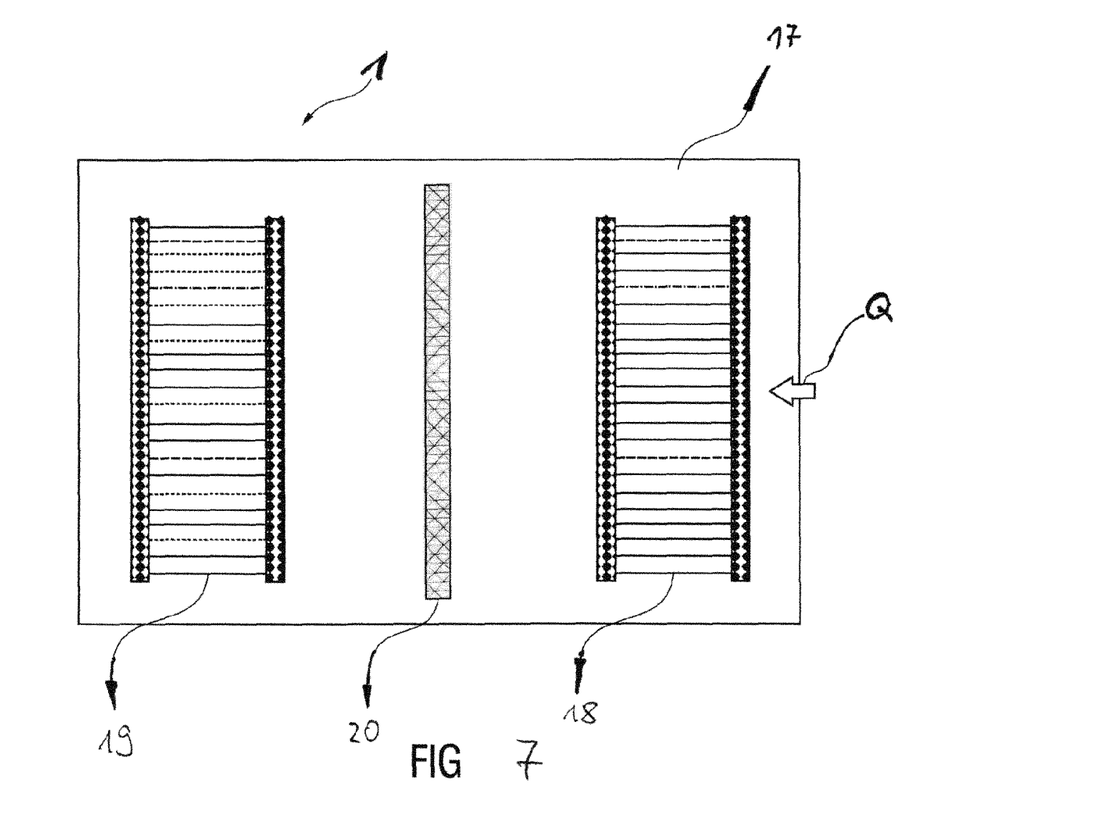
FIG. 7 shows a sensor element of an air mass flow meter according to the teachings of the present disclosure.

FIG. 7 shows a sensor element 1 of an air mass flow meter 6. The sensor element 1 comprises a substrate 17, on which a first temperature sensor element 18 and a second temperature sensor element 19 are disposed. A heater 20 is disposed on the substrate 17, between the first temperature sensor element 18 and the second temperature sensor element 19. The direction of the air mass flow Q is indicated by an arrow.

What is claimed is:

1. An air mass flow meter comprising:
   a sensor element for detecting an air mass flow (Q) and for generating a signal (S), and
   an electronic circuit for processing the signal (S) from the sensor element,
   wherein the sensor element generates a non-linear signal characteristic,
   wherein the electronic circuit includes:
   an element for converting the non-linear signal characteristic from the sensor element into a correcting signal characteristic which is non-linear at least in some segments,
   a filter element,
   a conversion element for converting the correcting signal characteristic which is non-linear at least in some segments into a non-linear signal characteristic, and a relay element for relaying the signals (S) detected by the sensor element and processed by the linearization element, the filter element, and the conversion element.

2. The air mass flow meter as claimed in claim 1, wherein the sensor element and the electronic circuit are formed on a single semiconductor element.

3. The air mass flow meter as claimed in claim 1, wherein the sensor element and the electronic circuit are produced using microsystem technology.

4. The air mass flow meter as claimed in claim 1, wherein the sensor element comprises a first temperature sensor element and a second temperature sensor element.

5. The air mass flow meter as claimed in claim 4, wherein the sensor element comprises a heating element disposed between the first and the second temperature sensor element.

6. A method for detecting an air mass flow using an air mass flow meter comprising a sensor element for detecting an air mass flow (Q) and for generating a signal (S), and an electronic circuit for processing the signal (S) from the sensor element, wherein the sensor element generates a non-linear signal characteristic, the method comprising:
converting the non-linear signal characteristic generated by the sensor element into a correcting, non-linear signal characteristic,
then filtering the correcting, non-linear signal characteristic,
then converting the filtered, correcting, non-linear signal characteristic into a non-linear signal characteristic, and
then generating an output signal conveying the signals (S) detected by the sensor element and processed by the linearization element, the filter element, and the conversion element.

7. An internal combustion engine comprising:
at least one cylinder fed by an associated fuel injection system including an injection pump and an injection nozzle;
an air intake pipe feeding air into the at least one cylinder;
a first air temperature sensor characterized by a non-linear signal to temperature output;
a processor receiving a first signal from the first air temperature sensor, converting the non-linear signal characteristic into a correcting, non-linear signal characteristic, then filtering the correcting, non-linear signal characteristic, then converting the filtered, correcting, non-linear signal characteristic into a non-linear signal characteristic, and then generating an output signal representative of the air mass based on the converted, filtered, corrected signal; and
an engine control unit adjusting at least one of operation of the fuel injection pump or the fuel injection nozzle based on the output signal from the processor.

8. An internal combustion engine as claimed in claim 7, further comprising:
a heating element downstream of the first temperature sensor; and
a second temperature sensor downstream of the heating element;
wherein the processor receives a second signal from the second temperature signal and generates the output signal based on both the first signal and the second signal.

9. An internal combustion engine as claimed in claim 7, further comprising a memory in communication with the processor, wherein the memory stores response characteristics for the first temperature sensor and production tolerances for the first temperature sensor.

10. An internal combustion engine as claimed in claim 8, further comprising a memory in communication with the processor, wherein the memory stores response characteristics and production tolerances for the first temperature sensor, the second temperature sensor, and the heating element.

* * * * *